United States Patent
Mishra et al.

(10) Patent No.: US 10,079,687 B2
(45) Date of Patent: Sep. 18, 2018

(54) SYSTEM AND METHOD FOR PASSWORD RECOVERY USING FUZZY LOGIC

(71) Applicant: ILANTUS TECHNOLOGIES PVT. LTD., Bangalore (IN)

(72) Inventors: Ashutosh Kumar Mishra, Bangalore (IN); Saurav Sharma, Bangalore (IN); Deepika Kuntar, Bangalore (IN)

(73) Assignee: ILANTUS TECHNOLOGIES PVT. LTD., Bangalore (IN)

( * ) Notice: Subject to any disclaimer, the term of this patent is extended or adjusted under 35 U.S.C. 154(b) by 273 days.

(21) Appl. No.: 15/096,767

(22) Filed: Apr. 12, 2016

(65) Prior Publication Data
US 2016/0301533 A1 Oct. 13, 2016

(51) Int. Cl.
*H04L 9/32* (2006.01)
*H04L 29/06* (2006.01)
*G06F 21/31* (2013.01)

(52) U.S. Cl.
CPC ............ *H04L 9/3271* (2013.01); *G06F 21/31* (2013.01); *H04L 63/083* (2013.01)

(58) Field of Classification Search
CPC ...... H04L 9/3271; H04L 63/083; G06F 21/31
See application file for complete search history.

(56) References Cited

U.S. PATENT DOCUMENTS

| | | | | |
|---|---|---|---|---|
| 5,913,192 A * | 6/1999 | Parthasarathy | ......... | G10L 17/24 704/244 |
| 8,396,711 B2 * | 3/2013 | Yee | ......... | G10L 17/24 379/88.01 |
| 9,754,101 B2 * | 9/2017 | Jakobsson | ......... | G06F 21/46 |
| 2007/0055871 A1 * | 3/2007 | Ghanea-Hercock | .... | G06F 21/31 713/168 |
| 2010/0106975 A1 * | 4/2010 | Vandervort | ......... | G06F 21/32 713/186 |
| 2011/0055585 A1 * | 3/2011 | Lee | ......... | H04L 9/0844 713/183 |
| 2015/0003693 A1 * | 1/2015 | Baca | ......... | G06F 21/00 382/124 |
| 2015/0371079 A1 * | 12/2015 | Kohlenberg | ......... | G06F 21/31 348/77 |

* cited by examiner

*Primary Examiner* — Beemnet Dada
(74) *Attorney, Agent, or Firm* — Barry Choobin; Patent 360 LLC

(57) ABSTRACT

The embodiments herein provide a method and system for password recovery using Fuzzy logic. The system includes a receiving module, a validation module, an authentication module, a display module, a memory module, and a network interface. The system uses a phonetic algorithm such as Soundex algorithm for enabling the password recovery process. The user credentials received through the receiving module is validated with the validation module at the time of accessing the application. The authentication module is configured to authenticate the user using a fuzzy logic derived from a phonetic algorithm, by matching the answers of the user with the stored answers to compute a score which is compared with a threshold score. The user is enabled to unlock the user device when the computed validation score is greater than the threshold score.

8 Claims, 3 Drawing Sheets

SYSTEM AND METHOD FOR PASSWORD RECOVERY USING FUZZY LOGIC

CROSS-REFERENCE TO RELATED APPLICATION

Benefit is claimed under 35 U.S.C. 119(a)-(d) to Foreign application Serial No. 713/CHE/2015 filed in India entitled "A SYSTEM AND METHOD FOR PASSWORD RECOVERY USING FUZZY LOGIC", on Apr. 13, 2015, which is herein incorporated in its entirety by reference for all purposes.

BACKGROUND

Technical Field

The embodiments herein are generally related to security mechanism for accessing computer applications. The embodiments herein are particularly related to a password management system and method. The embodiments herein are more particularly related to a system and method for a password recovery management using fuzzy logic.

Description of the Related Art

A typical computer application is accessed by entering a unique username and a password. The passwords are often regarded as a secret. The typical password is any one of a string, digits, special characters, or a combination of string, digits, and special characters. The password is used for authenticating and granting access to one or more protected applications, files, protocols, etc., When a user is unable to reproduce the password for accessing the application, a password recovery procedure is prompted to the user. The password recovery procedure is prompted in one or more ways. The typical password recovery procedure is to authenticate the user through one or more security questions before allowing the user to reset the password. The user responds to one or more and security questions. Generally, the security questions are presented to the user when the user account is created/registered, and the user is asked to provide the answers. Examples of these questions include the user's first car, where they went to high school, a city in which they completed graduation, etc. The password recovery is successful only on a correct entry of a response to the challenges. The recovery is unsuccessful even if there is a mismatch of a single character. There exists a situation where the user is unable to remember the exact response to the challenge that user has answered during an initial access to the application.

One of the conventional approaches for password recovery is to contact a system administrator for recovering the password and use the application. This method is not desirable as the user has to contact the system administrator even after entering the phonetically right response.

The other conventional approaches for password recovery using fuzzy logic are to develop an in-house matching algorithm and a database for matching the one or more entered phonetically similar passwords. This approach is undesirable as the database has to be updated each time a new phonetically similar word is found.

The other conventional approaches for a password recovery using fuzzy logic are based on Levenshtein algorithm. The Levenshtein algorithm is a string metric for measuring a difference between two sequences. However, this approach for password recovery is not desirable as the two different words are matched with entirely different words. For example, the words Rat and Cat, Height and Weight are matched.

Hence, there is a need for a method and system for matching a user-entered response and an actual response phonetically without any errors. Further, there is a need for a method and system that uses fuzzy logic for recovering the user-entered response and the actual response. Still further, there is a need for a system and method for recovering the user-entered response and the actual response on a real-time basis.

The above-mentioned shortcomings, disadvantages and problems are addressed herein and which will be understood by reading and studying the following specification.

OBJECTS OF THE EMBODIMENTS HEREIN

The primary object of the embodiments herein is to develop a method and system for password recovery using fuzzy logic.

Another object of the embodiments herein is to develop a method and system for password recovery using fuzzy logic and to enhance the user experience while recovering the password.

Yet another object of the embodiments herein is to develop a method and system to recover one or more passwords securely.

Yet another object of the embodiments herein is to develop a method and system to recover one or more passwords from an application launch screen.

Yet another object of the embodiments herein is to develop a method and system to reduce a load on the helpdesks regarding the password recovery calls.

Yet another object of the embodiments herein is to develop a method and system to recover the one or more passwords by matching a user provided response with an actual response dynamically at run-time.

Yet another object of the embodiments herein is to develop a method and system for password recovery using fuzzy logic and to automatically report the system administrator about the initiation and the closure of the password recovery.

These and other objects and advantages of the embodiments herein will become readily apparent from the following detailed description taken in conjunction with the accompanying drawings.

SUMMARY

The various embodiments herein provide a system and method for password recovery using fuzzy logic.

The system for enabling password recovery using a fuzzy logic for an application installed on a user device comprises a receiving module, a validation module, an authentication module, a display module, and a memory module.

The receiving module is configured to receive a user entry. The user entry includes access credentials for accessing the application. According to an embodiment herein, the receiving module prompts the user to register and provide access credentials for the first time. The access credentials include at least a user e-mail identity and a password. The information received by the receiving module is transmitted to the validation module.

The validation module is configured to validate the access credentials provided by the user. The validation module validates the user by comparing the access credentials provided by the user with the access credentials provided during the registration. The information received by the validation module is transmitted to the authentication module.

The authentication module is configured to authenticate the user by posing/posting a plurality of questions. The questions are selected from a question bank. The question bank includes the questions and answers provided during the time of registration. The authentication module authenticates the user by matching the answers provided by the user at the time of authentication and the pre-determined answers provided during the time of registration and stored already. The authentication module authenticates the user using a fuzzy logic. The fuzzy logic is derived from a phonetic algorithm.

The display module is configured to display the access credentials of the user and the questions for completing the authentication. According to an embodiment herein, the display module is communicably coupled to a user device.

The system includes a memory module configured to store the user information. The user information stored in the memory module include, but are not limited to the user credentials, a plurality of questions and answers for the questions, user metadata, application data, and application metadata.

According to an embodiment herein, the authentication module uses a Soundex algorithm as a phonetic algorithm for authenticating the user for enabling the password recovery. The Soundex algorithm is run to compare the answers provided by the user and the predetermined answer to compute a score. Further the algorithm is executed to compare the computed score with a threshold score. The algorithm is configured to enable user to unlock the user device when the computed score is greater than the threshold score.

According to an embodiment herein, the system further includes a network interface configured to provide a communication between the user device and the password management system/server through a communication network.

According to an embodiment herein, the user device is selected from a group consisting of a laptop, smartphone, desktop computer, a notebook computer, a wearable device, a smart television, and a device capable of connecting to a communication network.

According to an embodiment herein, the authentication module notifies the user and an administrator of the application, when the score computed is less than the pre-determined threshold.

The various embodiments herein provide a computer implemented method for enabling password recovery for an application using a fuzzy logic. The method includes receiving a user request, validating the access credentials provided by the user, authenticating the user by posing a plurality of questions, displaying the access credentials of the user using the display module, and storing the user information in a memory module.

According to an embodiment herein, the user request includes access credentials for accessing the application. The user is prompted to register with the application and provide access credentials for the first time, and the access credentials include at least a user e-mail identity, and a password.

According to an embodiment herein, the method includes validating the access credentials provided by the user through a validating module. The user is validated by comparing the access credentials provided during the registration.

According to an embodiment herein, the method includes authenticating the user by posing a plurality of questions. The questions are selected from a question bank. The question bank includes the questions and answers provided by the user during the time of registration. According to an embodiment herein, the user is authenticated with a fuzzy logic, and the fuzzy logic is derived from a phonetic algorithm.

The method involves displaying the access credentials of the user through the display module, and the questions for completing the authentication. According to an embodiment herein, the display module is further configured to display the access credentials.

The method further comprises storing the user information in the memory module. According to an embodiment herein, the user information include user credentials, access credentials, a plurality of questions and answers for the questions, user metadata, application data, and application metadata.

According to an embodiment herein, the input user access credentials is authenticated through a Soundex algorithm. The Soundex algorithm compares the answers provided by the user, and the predetermined answer to compute a score. The computed score is compared with a threshold score and the user is enabled to unlock the user device, when the computed score is greater than the threshold score.

According to an embodiment herein, the method further comprises communicating between the device and the authentication server or password management system through a network interface and a communication network.

According to an embodiment herein, the method further comprises notifying the user and an administrator of the application, when the computed score is less than the pre-determined threshold.

According to an embodiment herein, the user device is selected from a group consisting of a laptop, smartphone, desktop computer, a notebook computer, a wearable device, a smart television, and device capable of connecting to a communication network.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
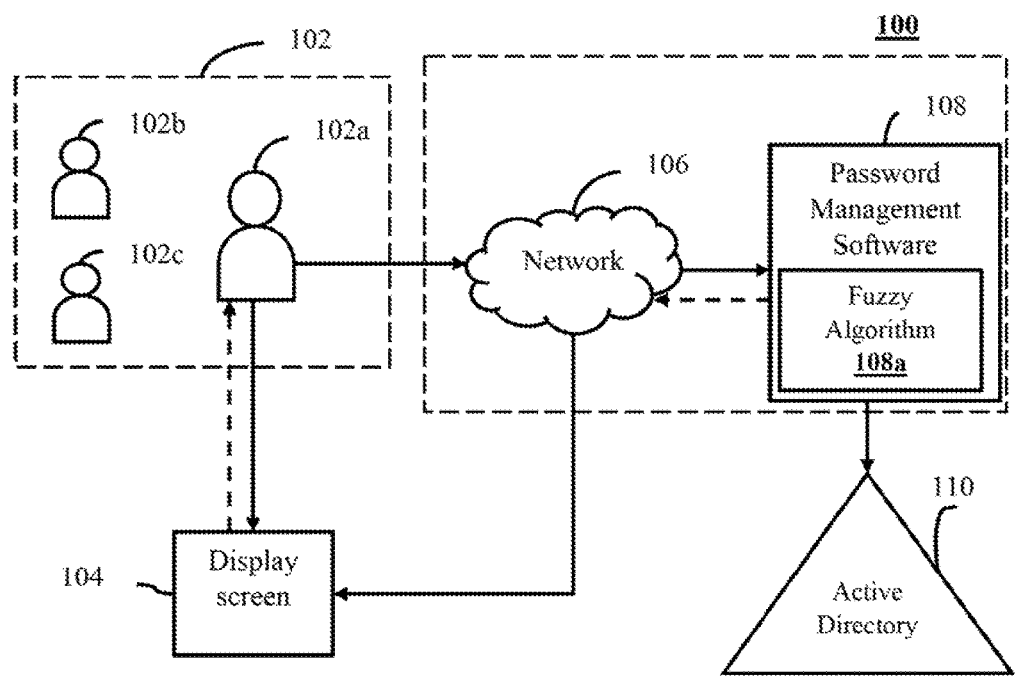
FIG. 1 illustrates a block diagram of a password recovery system using fuzzy logic, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for password recovery using fuzzy logic.

The system for enabling password recovery using a fuzzy logic for an application installed on a user device comprises a receiving module, a validation module, an authentication module, a display module, and a memory module.

The receiving module is configured to receive a user entry. The user entry includes access credentials for accessing the application. According to an embodiment herein, the receiving module prompts the user to register and provide access credentials for the first time. The access credentials include at least a user e-mail identity and a password. The information received by the receiving module is transmitted to the validation module.

The validation module is configured to validate the access credentials provided by the user. The validation module validates the user by comparing the access credentials provided by the user with the access credentials provided during the registration. The information received by the validation module is transmitted to the authentication module.

The authentication module is configured to authenticate the user by posing/posting a plurality of questions. The questions are selected from a question bank. The question bank includes the questions and answers provided during the time of registration. The authentication module authenticates the user by matching the answers provided by the user at the time of authentication and the pre-determined answers provided during the time of registration and stored already. The authentication module authenticates the user using a fuzzy logic. The fuzzy logic is derived from a phonetic algorithm.

The display module is configured to display the access credentials of the user and the questions for completing the authentication. According to an embodiment herein, the display module is communicably coupled to a user device.

The system includes a memory module configured to store the user information. The user information stored in the memory module include, but are not limited to the user credentials, a plurality of questions and answers for the questions, user metadata, application data, and application metadata.

According to an embodiment herein, the authentication module uses a Soundex algorithm as a phonetic algorithm for authenticating the user for enabling the password recovery. The Soundex algorithm is run to compare the answers provided by the user and the predetermined answer to compute a score. Further the algorithm is executed to compare the computed score with a threshold score. The algorithm is configured to enable user to unlock the user device when the computed score is greater than the threshold score.

According to an embodiment herein, the system further includes a network interface configured to provide a communication between the user device and the password management system/server through a communication network.

According to an embodiment herein, the user device is selected from a group consisting of a laptop, smartphone, desktop computer, a notebook computer, a wearable device, a smart television, and a device capable of connecting to a communication network.

According to an embodiment herein, the authentication module notifies the user and an administrator of the application, when the score computed is less than the pre-determined threshold.

The various embodiments herein provide a computer implemented method for enabling password recovery for an application using a fuzzy logic. The method includes receiving a user request, validating the access credentials provided by the user, authenticating the user by posing a plurality of questions, displaying the access credentials of the user using the display module, and storing the user information in a memory module.

According to an embodiment herein, the user request includes access credentials for accessing the application. The user is prompted to register with the application and provide access credentials for the first time, and the access credentials include at least a user e-mail identity, and a password.

According to an embodiment herein, the method includes validating the access credentials provided by the user through a validating module. The user is validated by comparing the access credentials provided during the registration.

According to an embodiment herein, the method includes authenticating the user by posing a plurality of questions. The questions are selected from a question bank. The question bank includes the questions and answers provided by the user during the time of registration. According to an embodiment herein, the user is authenticated with a fuzzy logic, and the fuzzy logic is derived from a phonetic algorithm.

The method involves displaying the access credentials of the user through the display module, and the questions for completing the authentication. According to an embodiment herein, the display module is further configured to display the access credentials.

The method further comprises storing the user information in the memory module. According to an embodiment herein, the user information include user credentials, access credentials, a plurality of questions and answers for the questions, user metadata, application data, and application metadata.

According to an embodiment herein, the input user access credentials is authenticated through a Soundex algorithm. The Soundex algorithm compares the answers provided by the user, and the predetermined answer to compute a score. The computed score is compared with a threshold score and the user is enabled to unlock the user device, when the computed score is greater than the threshold score.

According to an embodiment herein, the method further comprises communicating between the device and the authentication server or password management system through a network interface and a communication network.

According to an embodiment herein, the method further comprises notifying the user and an administrator of the application, when the computed score is less than the pre-determined threshold.

According to an embodiment herein, the user device is selected from a group consisting of a laptop, smartphone, desktop computer, a notebook computer, a wearable device, a smart television, and device capable of connecting to a communication network.

The various embodiments herein provide a system and method for password recovery using fuzzy logic. According to an embodiment herein, the user requests for a password recovery mechanism and a password reset operation is initiated by the main server system. When an end user initiates the password recovery mechanism, the prompt for user credentials are displayed on the display screen of the end user. According to an embodiment herein, the prompt for user credential displayed by the main server system is a user identifier. According to another embodiment herein, the end user is again prompted to enter the user ID for which the password has to be recovered.

When the user provides user ID on the display screen, a query is sent to an active directory to validate the user identifier. According to an embodiment herein, a plurality of rules is set to the active directory to validate the end user who has requested for the password recovery.

According to an embodiment herein, the password recovery mechanism is terminated upon an unsuccessful validation of the user ID.

According to an embodiment herein, the validated user is displayed with the one or more security questions/challenges on the display screen by the password management software. According to an embodiment herein the security question/challenges are posed/posted to the end user during an initial creation of an account or while granting an initial access to the one or more protected applications by the password management software.

According to an embodiment herein, a response provided by the end user during the initial access of the one or more protected applications is stored in a central database.

According to an embodiment herein, the security question/challenge is displayed on a display screen of the end user using a communication network. According to an embodiment herein, the security questions are local to the end user's device is displayed without communicating through the communication network.

Further, the response provided by the end user for the security question/challenge is fetched from the central server. According to an embodiment herein, the response to the challenge is submitted through the communication network.

Furthermore, the fuzzy algorithm module is requested for matching the response provided by the end user for the challenge/security question posted with the actual response stored in the central database. The request to the fuzzy algorithm module is communicated using the communication network.

Furthermore, the decision for matching the responses provided by the user and the actual response stored in the database is computed. According to an embodiment herein, the fuzzy algorithm module in the password management software compares the response received by the end user with the actual response and calculates the score difference using one or more phonetic algorithms.

According to an embodiment herein, the score difference is calculated based on the one or more rules set by the developer of the fuzzy algorithm. According to an embodiment herein, the password matching is computed for string characters. According to another embodiment herein, the passing response is computed for all data types.

According to an embodiment herein, the rules for matching the responses are fixed. According to another embodiment of the embodiment herein, the rules for matching the responses are flexible and are altered by the system administrator.

Further, the password recovery is judged to be successful or unsuccessful based on the scores computed by the fuzzy algorithm module in the password management software. The end user is provided an access to the one or more protected applications on the successful password recovery. According to an embodiment herein the end user is denied access to the one or more protected applications when the password recovery is unsuccessful.

According to an embodiment herein, the status of the password recovery mechanism is reported to the concerned authority such as system administrator, application manager, and the like.

According to an embodiment herein, the client side application (agent) for the password recovery mechanism using fuzzy logic is downloaded by each end user on each computing device locally.

According to an embodiment herein, the client-side application for the password mechanism using fuzzy logic is pushed by the system administrator for a plurality of the computing devices. According to an embodiment herein, the password recovery mechanism using fuzzy logic is obtained as a Credential Provider. According to another embodiment herein, the password recovery mechanism using fuzzy logic is obtained as a Graphical Identification and Authentication (GINA) mechanism/format.

FIG. 1 illustrates a block diagram of password recovery system using fuzzy logic, according to one embodiment herein. The FIG. 1 includes an end user group 102 comprising an end user 102a, an end user 102b, and an end user 102c. According to an embodiment herein, the end user group 102 access the web application, mobile application, in-house application, and the like using a computing device. According to an embodiment herein, the end users 102a, 102b, 102c are humans/end user devices. According to another embodiment herein, the end users/end user devices 102a, 102b, 102c are connected to the respective computer systems.

According to an embodiment herein, the display screen 104 is a screen on the computing device of the end user group 102 that is used for accessing one or more protected applications. The end user group 102 enters one or more credentials on the display screen 104 for accessing the one or more protected applications.

According to an embodiment herein, the computing devices used by the end user group 102 include but are not limited to desktop computer, laptop computer, tablet computer, mobile phone, smart phone, Personal Device Assistants (PDAs), gaming consoles, wearable devices, and the like.

According to an embodiment herein, the communication network 106 is used for communicating and validating the user credentials for providing the access to one or more protected applications by the end user/end user devices 102a, 102b, and 102c. According to an embodiment herein, the communication network include but are not limited to Internet, Intranet, Wireless network, Local Area Network (LAN), Wide Area Network (WAN), Metropolitan area network (MAN), and the like.

According to an embodiment herein, the communication network 106 has one or more topologies. According to an embodiment herein, the network topology of the communication network 106 include but are not limited to star network, mesh network, tree network, jellyfish network, bow network, and the like.

According to an embodiment herein, the active directory 110 is used for authenticating and authorizing the end user/end user devices 102a, 102b, and 102c while attempting to access the one or more protected applications by assigning and enforcing security policies to the computing devices used by each of the end user/end user devices 102a, 102b, and 102c. When an end user logs into a computer using the display screen 104 for accessing one or more protected applications, the active directory 110 checks the submitted credentials of the end user/user device to determine whether the user is a system administrator or a normal user.

According to an embodiment herein, the fuzzy algorithm module 108a is a computing module for matching the security question response of the end user/user device during the password recovery mechanism. According to an embodiment herein, the fuzzy algorithm module 108a is configured within the password management software 108. According to an embodiment herein, the fuzzy algorithm module 108a judges whether the end user is allowed to access the one or more protected applications based on the credentials entered by the end user. According to an embodiment herein, the fuzzy algorithm module 108a is operated based on one or more phonetic algorithms such as Soundex algorithm.

When one of the end user in the end user group 102 requests for password recovery, a password recovery mechanism is initiated. According to an embodiment herein, one of the end user in the end user group 102, say the end user 102a, initiates for password recovery. The request is communicated to the active directory 110 through the communication network 106. The active directory 110 validates the end user 102a. The password management software 108 poses the one or more security questions/challenges on the display screen 104. The end user 102a responses to the security questions/challenges on the display screen 104.

According to an embodiment herein, the response provided by the end user 102a to the security question/challenge is verified using the fuzzy algorithm database 108. The fuzzy algorithm 108a verifies and validates the end user 102a using a phonetic algorithm such as Soundex algorithm. The results are computed dynamically at the run-time by the fuzzy algorithm module 108a and are displayed on the display screen 104 of the end user 102a. The response provided by the end user 102a is either accepted or rejected. The result is displayed on the display screen 104.

Figure 2:
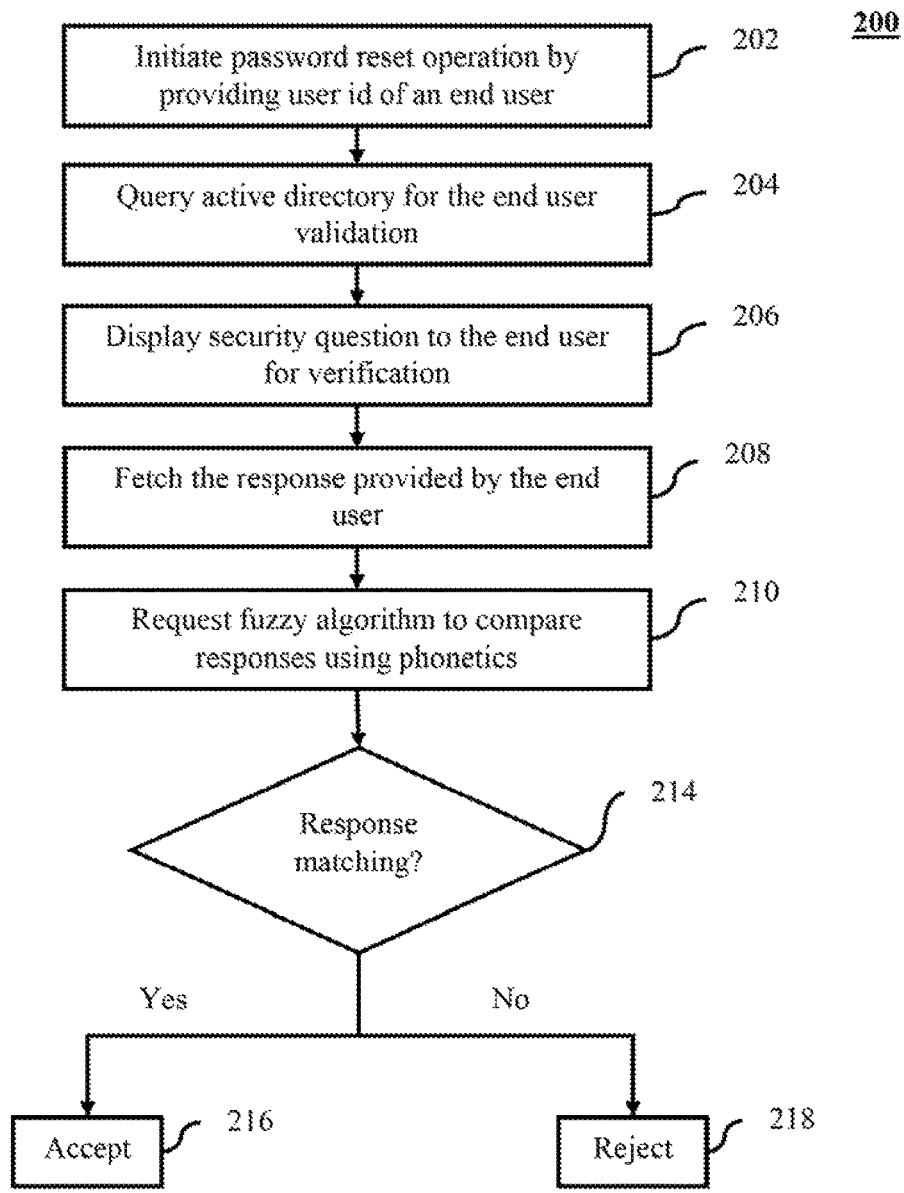
FIG. 2 illustrates a flowchart explaining a password recovery method using fuzzy logic, according to one embodiment herein.

FIG. 2 illustrates a flowchart explaining the password recovery mechanism, according to one embodiment herein. At step 201, the user/user device requests for password recovery mechanism, and a password reset operation is initiated by the main server system. When an end user/user device initiates the password recovery mechanism, the prompt for user credentials are displayed on the display screen of the end user device. According to an embodiment herein, the user credential prompt displayed by the main server system is a user identifier. According to another embodiment herein, the end user/user device is again prompted to enter the user ID for which the password has to be recovered. According to an embodiment herein, the user identifier is a string of characters that enables the validation of the end user across devices, groups of sessions using a unique, and non-personally identifiable ID.

At step 204, a query is sent to the active directory to validate the user identifier displayed on the display screen. According to an embodiment herein, a plurality of rules is set to the active directory to validate the end user/user device requesting for the password recovery. When the user ID is not validated by the active directory, password recovery mechanism is terminated.

At step 206, the validated user is displayed with the one or more security questions/challenges on the display screen. According to an embodiment herein, the security question/challenges are posed/posted to the end user/user device by the password management software during the initial creation of the account or while granting an initial access to the one or more protected applications. According to an embodiment herein, all the security questions posted during the initial access of the one or more protected applications is displayed. According to an embodiment herein, the selected questions from the plurality of the questions are posted to the end user/user device.

The response provided by the end user/user device during the initial access of the one or more protected application is stored in a central database. Examples of the security questions/challenges displayed to the end user include "The city in which the end user completed graduation", "Color of the first car", "Date of birth", and the like. According to an embodiment herein, the security question/challenge is displayed on the display screen of the end user device using a communication network. According to an embodiment herein, the security questions are local to the end user's device is displayed without communicating through the communication network.

At step 208, the response provided by the end user/user device for the security question/challenge is fetched from the central server. According to an embodiment herein, the response to the challenge is fetched after the user hits the submit button or the submit button in the interface/graphical user interface displayed on the end user device is pressed. According to an embodiment herein, the response to the challenge is fetched from the central server dynamically. According to an embodiment herein, the response to the challenge is submitted through the communication network.

At step 210, the fuzzy algorithm module is requested for matching the response provided by the end user for the challenge/security question posted with the actual response stored in the central database. The request to the fuzzy algorithm module is communicated using the communication network.

At step 212, the comparison process for matching the responses provided by the user/user device and the actual response is initiated. According to an embodiment herein, the fuzzy algorithm module is configured to compare the response received from the end user device with the actual stored response and calculates the score difference. According to an embodiment herein, the score difference is calculated based on the one or more rules set by the developer of the fuzzy algorithm. According to an embodiment herein, the response matching is computed for string characters. According to an embodiment herein, the passing response is computed for all data types.

According to an embodiment herein, the rules for matching the responses are fixed. According to an embodiment herein, the rules for matching the responses are flexible and altered by the system administrator.

At step 216, the password recovery is successful. According to an embodiment herein, the response is accepted and the end user is provided access to the one or more protected applications. The acceptance of the response is based on the scores computed by the fuzzy algorithm module. According to an embodiment herein, the response is accepted if the response score exceeds a certain score set by the developer or the system administrator.

At step 218, the password recovery is unsuccessful. According to an embodiment herein, the response is rejected and the end user is denied the access to the one or more protected applications. The rejection of the response is based on the scores computed by the fuzzy algorithm module. According to an embodiment herein, the response is rejected if the response score is less than a preset score set by the developer or the system administrator. On the unsuccessful attempt to recover the password, the end user is prompted to complete one or more further steps for recovering the password.

According to an embodiment herein, the end user is prompted for mobile verification, keystroke verification, contacting system administrator, and the like.

According to an embodiment herein, the concerned authority such as the system administrator, the server administrator, the application manager is notified upon the successful completion of the password recovery. The analytics on the password recovery mechanism is obtained by notifying the concerned personnel, According to an embodiment herein, the application for the password recovery mechanism using fuzzy logic is downloaded by each end user on each computing device locally. According to an embodiment herein, the application for the password mechanism using fuzzy logic is pushed by the system administrator for a plurality of the computing devices. According to an embodiment herein, the password recovery mechanism using fuzzy logic is obtained as a Credential Provider. According to another embodiment herein, the password recovery mechanism is provided as a Graphical Identification and Authentication (GINA) mechanism/format.

Figure 3:
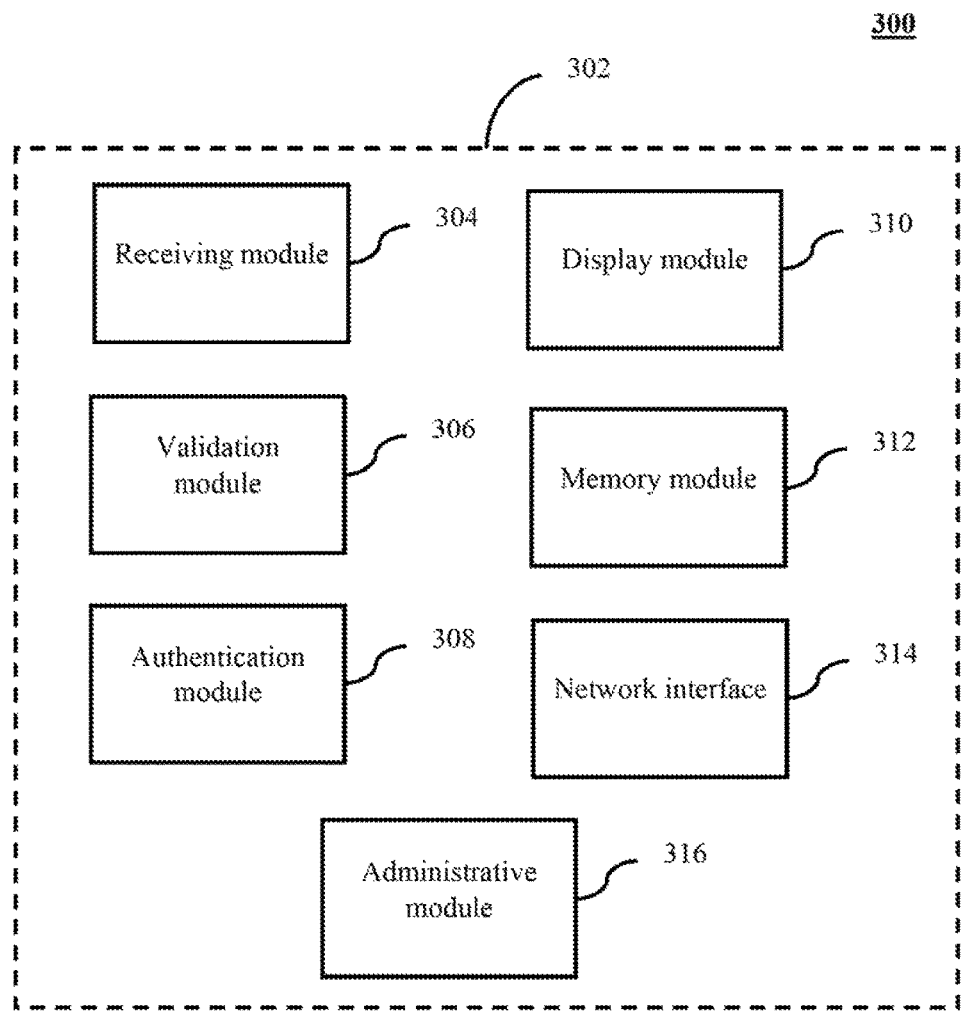
FIG. 3 illustrates a block diagram of a system for password management and recovery the password recovery process using a fuzzy logic, according to an embodiment herein.

FIG. 3 illustrates a block diagram of a system for enabling a password recovery for an application installed on a user device using a fuzzy logic, according to an embodiment herein. The system includes a receiving module 304, a validation module 306, an authentication module 308, a display module 310, a memory module 312, a network interface 314, a memory module 316, and an administrative module 318.

The receiving module 304 receives a user request for enabling the password recovery for an application. The user request includes access credentials for accessing the application. The receiving module 304 initially prompts the user to register the application by providing the details of the user. The details provided by the user include, but are not limited to e-mail identity, password, user profession, the purpose of use, user location, and the like. Once the details are received from the user, the details are transmitted to a validation module.

The validation module 306 is configured to validate the user/device by validating the access credentials provided by the user/device. According to an embodiment herein, the validation module 306 validates the user/device once the user/device submits the access credentials for accessing the application after the registration for the application. The validation module 306 is further configured to compare the access credentials provided by the user/device for accessing the application, and the access credentials provided during the registration and computes a score/validation score. When there is a mismatch in the access credentials, a password recovery mechanism is triggered. The information received by the validation module 306 is transmitted to the authentication module 308.

The authentication module 308 is configured to receive the details from the validation module 306 and authenticate the user/device for enabling the password recovery. According to an embodiment herein, the authentication module 308 is configured to authenticate the user/device by posing a plurality of questions to the user/device. The plurality of questions is selected from a question bank which is stored in the memory module 312. According to an embodiment herein, the authentication module 308 is configured to authenticate the user/device by matching the answers provided by the user/device and the pre-determined answers.

According to an embodiment herein, the authentication module 308 is configured to authenticate the user/device using a fuzzy logic. The fuzzy logic is derived from a phonetic algorithm. The authentication module 308 uses a Soundex algorithm for authenticating the user. For example, when the authentication module 308 poses the question as "Which is your favorite computer?", and the user answers the question as MAK, the user is allowed to access the application, as the answer provided by the user for the question during the registration is "MAC". The answers provided by the user during the registration and during the validation are phonetically correct according to the Soundex algorithm, and therefore, the user is validated.

The validation module 308 is configured to set a threshold value/score for a phonetical matching of the answers entered/submitted by the user/device. When the answer entered/submitted by the user/user device exceeds the threshold score, the password recovery is enabled successfully. When the answer entered/submitted by the user/device does not exceed the threshold score, the password recovery process is found/judged to be failed. Then the user and the administrators are notified accordingly. Further, once the administrator is notified, the administrator contacts the user/device for processing the password recovery.

The system is provided with a display module 310 for displaying the access credentials of the user/device. Further, the display module 310 is configured to display the questions for completing the authentication process. Furthermore, the display module 310 is configured to display the status of the password recovery mechanism.

The system is provided with a memory module 312 for storing the user information. According to an embodiment herein, the user information stored in the memory module 312 include but are not limited to user credentials, a plurality of questions and answers for the questions, user metadata, application data, and the application metadata.

According to an embodiment herein, authentication module 308 uses a Soundex algorithm as a phonetic algorithm for authenticating the user/device for enabling the password recovery. According to an embodiment herein, the Soundex algorithm is configured/run to compare the answers provided by the user/device and the predetermined answer provided during the time of registration and stored already to compute a validation score. The computed score is compared with a threshold score. The user/user device is enabled to unlock the user device when the computed score is greater than the threshold score.

According to an embodiment herein, a network interface 314 is provided and configured to provide a communication between the user/user device and the password recovery/management system through a communication network. The examples of the communication network include, but are not limited to the internet, an intranet, a telephonic network, a radio network, wide area network, local area network, and the like.

According to an embodiment herein, the user device is selected from a group consisting of a laptop, smartphone, desktop computer, a notebook computer, a wearable device, a smart television, a device capable of connecting to a communication network.

The various embodiments herein provide a computer implemented method comprising instructions stored on a non-transitory computer readable storage medium and run on a computing device provided with hardware processor and memory for enabling a password recovery for an application using a fuzzy logic, is provided. At first, the user request for enabling password recovery of an application from a user/user device is received through a receiving module. According to an embodiment herein, the user request includes access credentials for accessing the application. Initially, the user/user device is prompted to register with the application and provide access credentials for the first time. The details requested while registering for the application include but are not limited to a user e-mail identity, a user password, alternate e-mail id, phone number, contact address, and the like.

Once the user credentials and details are obtained, the user/device is validated through a validating module. The user/device is validated by comparing the access credentials provided during the registration and the access credentials provided during the request to access the application.

Further to the validation, an authentication process is set up for enabling the password recovery. According to an embodiment herein, a plurality of questions are posed/posted for authenticating the user/user device. The questions are selected from a question bank stored in the memory module. According to an embodiment herein, a user/user device is prompted to answer a series of security questions during a registration process to the application. A few questions are selected from the question bank to authenticate the user through the user device for enabling the password recovery process. The user/device submits the answers to the questions posed/posted. Based on the questions answered/submitted by the user/user device, the password recovery process is enabled.

According to an embodiment herein, the authentication module is configured to authenticate the user/user device to enable password recovery using a fuzzy logic algorithm. According to an embodiment herein, the fuzzy logic algorithm is a phonetic algorithm such as a Soundex algorithm. The Soundex algorithm is run/configured to compares the answers provided by the user/user device during the registration, and the answers provided during the accessing of the application to computes a validation score. When the computed validation score exceeds a pre-determined threshold score value, a password recovery process is judged to be successful. When the validation score does not exceed the pre-determined threshold score value, the password recovery process is judged to be failed or unsuccessful. The user/user device and the administrator are notified accordingly. According to an embodiment herein, the threshold score for authenticating the user/user device is set by the owner of the application.

Further, the method includes displaying the access credentials of the user/user device through the display module. According to an embodiment herein, the user credentials, questions, answers, and the status of the password recovery and the like.

The method for enabling password recovery also includes storing the user information in a memory module. The information stored in the memory module include, but are not limited to user credentials, access credentials, a plurality of questions and answers for the questions, user metadata, application data, and application metadata.

According to an embodiment herein, the method further includes communicating between the user device and the password recovery management server/system through a communication interface and a communication network.

According to an embodiment herein, the user device is selected from a group consisting of a laptop, smartphone, desktop computer, a notebook computer, a wearable device, a smart television, and a device capable of connecting to a communication network.

The various embodiments herein provide a method and system for recovering the password for one or more protected application using fuzzy logic.

The password recovery system and methods disclosed in the embodiments herein provides a simple mechanism for recovering the password. The system and method provides a secure pathway for recovering the password. An enhanced and easy user interface is provided for the password recovery mechanism. The system and method enables to reduce the number of helpdesk calls to the customer care regarding the password recovery. The password is recovered even with the approximate response provided by the end user.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for enabling password recovery using a fuzzy logic for an application installed on a user device, the system comprising:

a receiving module configured to receive a user entry through a user device, and wherein the user entry includes access credentials for accessing an application, wherein the receiving module is configured to prompt the user to register and provide access credentials for the first time, and wherein the access credentials include at least user e-mail identity and a password;

a validation module configured to validate the access credentials provided by the user, and wherein the validation module is configured to validate the user by comparing the access credentials provided by the user at a time of accessing the application with the access credentials provided during a registration process, and wherein the validation module is coupled to the receiving module;

an authentication module configured to authenticate the user by posing/posting a plurality of questions, and wherein the questions are selected from a question bank, and wherein the question bank includes the questions and answers provided during the time of registration, and wherein the authentication module is configured to authenticate the user by matching the answers provided by the user and the pre-determined answers, and wherein the authentication module is configured to authenticate the user using a fuzzy logic, and wherein the fuzzy logic is derived from a phonetic algorithm, wherein the authentication module is coupled to the validation module;

a display module configured to display the access credentials of the user and the questions for completing the authentication, and wherein the display module is communicably coupled to the user device; and a memory configured for storing the user information, wherein the user information include the question bank, the user credentials, a plurality of questions and answers for the questions, user metadata, application data, and application metadata;

wherein the authentication module is configured to run a Soundex algorithm as a phonetic algorithm for authenticating the user for enabling the password recovery, and wherein the Soundex algorithm is run to compares the answers provided by the user, and a predetermined answer provided by the user at the time of registration process to compute a validation score, and wherein the authentication module is configured to compare the computed score with a threshold score, and wherein the authentication module is configured to enable the user to unlock the user device when the computed score is greater than the threshold score.

2. The system according to claim 1 further comprises a network interface configured to provide a communication to the user device through a communication network.

3. The system according to claim 1, wherein the user device is selected from a group consisting of a laptop, smartphone, desktop computer, a notebook computer, a wearable device, a smart television, a device capable of connecting to a communication network.

4. The system according to claim 1, wherein the authentication module is configured to notify the user device and an administrator of the application when the score computed is less than the pre-determined threshold.

5. A computer implemented method comprising instructions stored on a non-transitory computer-readable storage medium and executed on a computing device comprising a hardware processor and a memory for enabling password recovery for an application using a fuzzy logic, the method comprises:

receiving a user request from a user device for enabling a password recovery of an application through a receiving module, and wherein the user request includes access credentials for accessing the application, and wherein the user is prompted to register with the application and provide access credentials for the first time, and wherein the access credentials include at least a user e-mail identity, and a password;

validating the access credentials provided by the user through a validating module, and wherein the user is validated by comparing the access credentials provided during the registration;

authenticating the user by posing a plurality of questions, wherein the questions are selected from a question bank, and wherein the question bank includes the questions and answers provided by the user during the time of registration, and wherein the user is authenticated by using a fuzzy logic, wherein the fuzzy logic is derived from a phonetic algorithm;

displaying the access credentials of the user and the questions for completing the authentication through a display module, and wherein the displaying includes displaying the access credentials; and storing the user information in a memory module, wherein the user information includes user credentials, access credentials, a plurality of questions and answers for the questions, user metadata, application data, and application metadata;

wherein the user access credentials are authenticated through a Soundex algorithm, wherein the Soundex algorithm is run/configured to compares the answers provided by the user, and the predetermined answer provided by the user at the time of registration to compute a validation score, and wherein the computed validation score is compared with a threshold score by the authentication module, and wherein the user is enabled to unlock the user device when the computed validation score is greater than the threshold score.

6. The method according to claim 5 further comprises communicating with the user device through a communication network.

7. The method according to claim 5 further comprises notifying the user and an administrator of the application through a notification module, when the computed validation score is less than the pre-determined threshold score.

8. The method according to claim 5, wherein the user device is selected from a group consisting of a laptop, smartphone, desktop computer, a notebook computer, a wearable device, a smart television, a device capable of connecting to a communication network.

* * * * *